US012580776B2

(12) United States Patent
Yadav et al.

(10) Patent No.: US 12,580,776 B2
(45) Date of Patent: Mar. 17, 2026

(54) APPLICATION INTEGRITY VERIFICATION FOR ENTERPRISE RESOURCE ACCESS

(71) Applicant: Omnissa, LLC, Mountain View, CA (US)

(72) Inventors: Amit Kumar Yadav, Marietta, GA (US); Utkarsh Singh, Bangalore (IN); Nikhil Jere, Kalaburagi (IN); Martin Kniffin, Roswell, GA (US); Rabish Kumar, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 190 days.

(21) Appl. No.: 18/376,444

(22) Filed: Oct. 4, 2023

(65) Prior Publication Data

US 2025/0030558 A1      Jan. 23, 2025

(30) Foreign Application Priority Data

Jul. 20, 2023    (IN) .............................. 202341048790

(51) Int. Cl.
*H04L 9/32*          (2006.01)
(52) U.S. Cl.
CPC .......... *H04L 9/3263* (2013.01); *H04L 9/3247* (2013.01)

(58) Field of Classification Search
None
See application file for complete search history.

(56) References Cited

U.S. PATENT DOCUMENTS

| | | | | |
|---|---|---|---|---|
| 8,843,741 | B2 * | 9/2014 | Koster ................ | H04L 63/0807 |
| | | | | 713/156 |
| 9,507,920 | B2 * | 11/2016 | Yach ..................... | H04L 63/123 |
| 11,729,147 | B2 * | 8/2023 | Pabijanskas ........ | H04L 63/0428 |
| | | | | 726/15 |

* cited by examiner

*Primary Examiner* — Mayasa A. Shaawat
(74) *Attorney, Agent, or Firm* — Kim & Stewart LLP

(57)          ABSTRACT

Disclosed are various approaches for ensuring application integrity for enterprise resource access. In some examples, a client device extracts installed application data from a local instance of an application that is installed on the client device. The installed application data includes actual certificate-based signature information for the local instance of the application. An application verification status is generated using the actual certificate-based signature information and the expected certificate-based signature information; and network access to a protected set of enterprise resources is permitted or denied using the application verification status.

14 Claims, 4 Drawing Sheets

APPLICATION INTEGRITY VERIFICATION FOR ENTERPRISE RESOURCE ACCESS

RELATED APPLICATIONS

Benefit is claimed under 35 U.S.C. 119(a)-(d) to Foreign Application Serial No. 202341048790 filed in India entitled "APPLICATION INTEGRITY VERIFICATION FOR ENTERPRISE RESOURCE ACCESS", on Jul. 20, 2023, by VMware, Inc., which is herein incorporated in its entirety by reference for all purposes.

BACKGROUND

In an enterprise setting, virtual private networks, tunnels, and other protections can be utilized to protect application access to enterprise resources such as data files, function endpoints, and other items. Modern resource access solutions can include a list of applications that can be allowed access to enterprise resources. As a result, applications have to be identified consistently.

One way of checking application identity is to verify its path or executable name. However, this check can be subject to security concerns. A user that has access to the file's location and the ability to rename files can rename another executable file and place it in the file path or folder where the genuine file is supposed to be located. This can allow a compromised executable to obtain access to protected enterprise resources. One way of overcoming this could be to revoke access to the file's location and/or the ability to rename files. However, this solution can be inappropriate for users that need such access for other aspects of their enterprise tasks.

Further, this solution can be intrusive for users who may be using their personal device in a bring your own device (BYOD) scenario. As a result, there is a need for improvements to application integrity verification checking for enterprise resource access by these applications.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples of a system that ensures application integrity is verified prior to allowing enterprise resources to be accessed. Resource access solutions can maintain a list of applications that can be allowed access to enterprise resources. As a result, applications have to be identified consistently in order to allow or deny application access to enterprise resources. One way of checking application identity can include the application's path and executable name. However, this kind of check can be subject to security concerns. A user that has access to the file's location and the ability to rename files can rename another executable file and place it in the file path or folder where the genuine file is supposed to be located. This can allow a compromised executable to obtain access to protected enterprise resources. One way of overcoming this could be to revoke access to the file's location and/or the ability to rename files. However, this solution can be intrusive for users who may be using their personal device in a bring your own device (BYOD) scenario. As a result, there is a need for improvements to application integrity verification checking for enterprise resource access by these applications. In order to solve problems with existing technologies, the present disclosure describes mechanisms that verify application integrity using application file hash and/or signature data hash verification, application certificate signing information verification, and other application verification checks in addition to executable process name, path, and other traditional checks.

Figure 1:
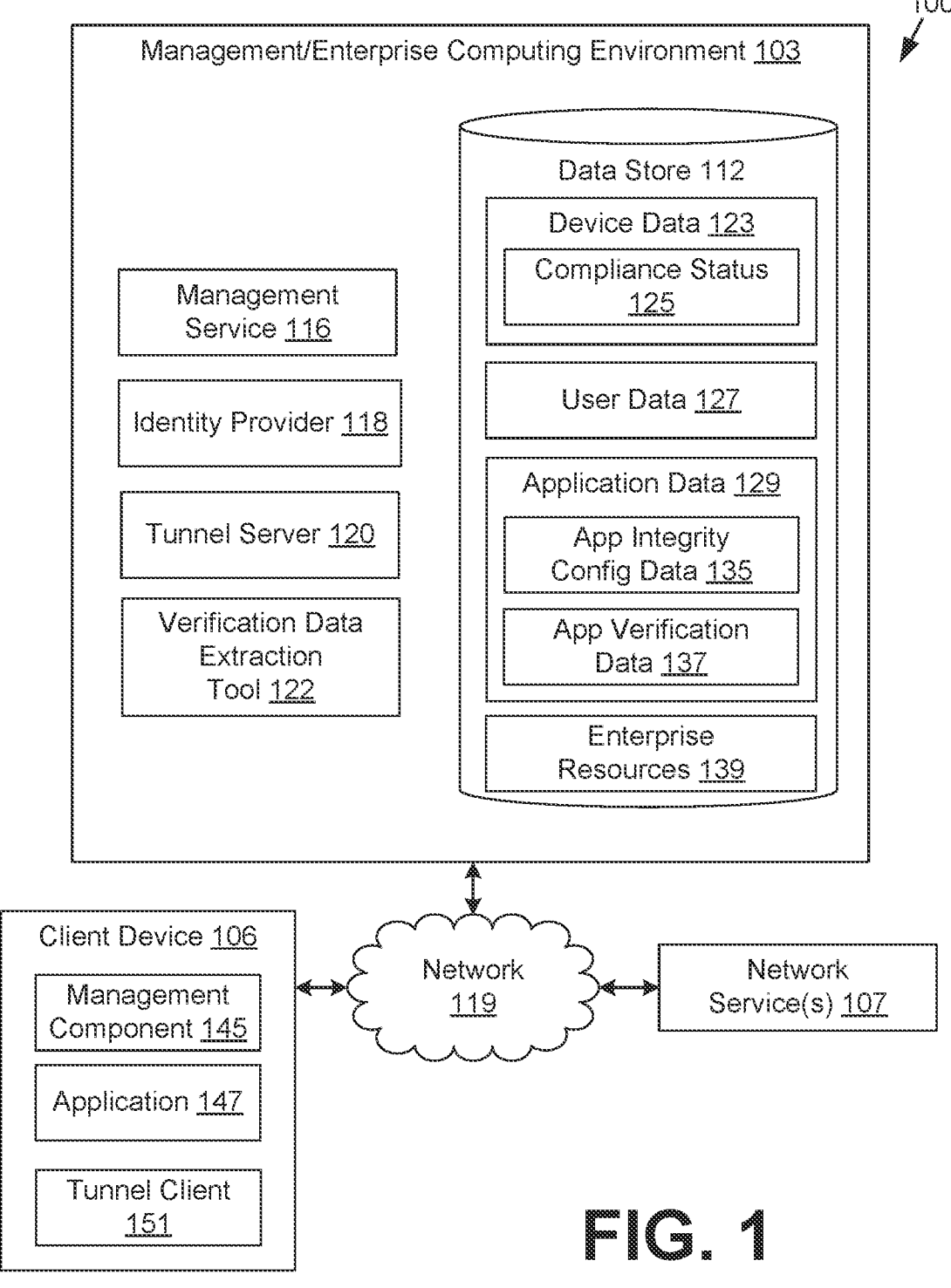
FIG. 1 is a block diagram depicting an example implementation according to various examples of the disclosure.

FIG. 1 illustrates an example of a networked environment 100 according to examples of the disclosure. In the depicted networked environment 100, an enterprise computing environment 103 is in communication with at least one client device 106 and a network service 107 over a network 119.

The network 119 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The enterprise computing environment 103 can be a computing environment that is operated by an enterprise, such as a business or another organization. The enterprise computing environment 103 can also include or be described as a management computing environment of a management service that is employed or utilized by an enterprise. The enterprise computing environment 103 includes a computing device, such as a server computer that provides computing capabilities. Alternatively, the enterprise computing environment 103 can employ multiple computing devices that are arranged in one or more server banks or computer banks. In one example, the computing devices can be located in a single installation. In another example, the computing devices for the enterprise computing environment 103 can be distributed among multiple different geographical locations. In one case, the enterprise computing environment 103 includes multiple computing devices that together can form a hosted computing resource or a grid computing resource. Additionally, the enterprise computing environment 103 can operate as an elastic computing resource where the allotted capacity of computing-related resources, such as processing resources, network resources, and storage resources, can vary over time. In other examples, the enterprise computing environment 103 can include or be operated as one or more virtualized computer instances that can be executed to perform the functionality that is described herein.

Various applications or other functionality can be executed in the enterprise computing environment 103. Also, various data can be stored in a data store 112 that can be accessible to the enterprise computing environment 103. The data store 112 can be representative of a plurality of data stores 112. The data stored in the data store 112 can be associated with the operation of the various applications or functional entities described below.

The components executed on the enterprise computing environment 103 can include a management service 116, an identity provider 118, a tunnel server 120, a verification data extraction tool 122 and other applications, services, processes, systems, engines, or functionality not discussed in detail herein. The management service 116 can be executed in the enterprise computing environment 103 to monitor and oversee the operation of one or more client devices 106 by administrators. In some examples, the management service 116 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 116.

The management service 116 can include a management console that can allow administrators to manage client devices 106 that are enrolled with the management service 116. User interfaces can allow an administrator to define policies for a user account or devices associated with an enterprise environment. The user interfaces can also include, for example, presentations of statistics or other information regarding the client devices 106 that can be managed by the management service 116. The identity provider 118, tunnel server 120, and verification data extraction tool 122 can be considered components of the management service 116, since they can work in concert to perform management for an enterprise.

The enterprise computing environment 103 can also execute an identity provider 118. The identity provider 118 can carry out federated user authentication on behalf of an enterprise. For example, the identity provider 118 can implement OAuth, SAML, or similar protocols that allow for federated user authorization or authentication. In examples of this disclosure, the identity provider 118 can also verify a user-and-device token provided by a client device 106 to provide multi-device SSO capabilities as described herein. The identity provider 118 can verify a user's credentials or identity and provide an authentication token, such as a SAML assertion, that can be provided to a network service 107 by an application on a client device 106 to authenticate the user's access to a service provided by the network service 107. The identity provider 118 can issue the authentication token to a client device 106 after verifying the identity of the user and/or client device 106 from which the user is attempting to access the network service 107. In the context of this disclosure, once a user has authenticated his identify from a first device, the identity provider 118 can authenticate the user from a second device that is managed by the management service 116 upon receiving a user-and-device token from the second device, where the user-and-device token can be verified by the identity provider 118.

The identity provider 118 can verify a user-and-device token issued by the management service 116 to a client device 106 that is enrolled as a managed device and that is associated with a particular user account. The user-and-device token can include information that allows the identity provider 118 to verify the user as well as the device. The user-and-device token can be signed so that the identity provider 118 can verify the authenticity of the token itself. If the user has already established his identity with the identity provider 118 from a first device, and the identity provider 118 subsequently receives a user-and-device token from a second device, the identity provider 118 can establish a SSO session with the second device if the user-and-device token can be validated. Validation can be performed by verifying the signature applied to the user-and-device token as well as the user and device identifying information contained within the token.

In some embodiments, the identity provider 118 can be implemented in a separate computing environment or by a separate entity other than the management service 116. The management service 116 can provide an application programming interface (API) with which the identity provider 118 can communicate to verify a user-and-device token or to obtain a public key with which the signature of a user-and-device token can be verified. The management service 116 can also provide an API through which the identity provider 118 can verify user identifiers or device identifiers that are embedded within a user-and-device token.

The management service 116 and/or identity provider 118 can also receive application usage data from applications or a management component installed on the client device 106. Applications on the client device 106 can report time and date information associated with the application usage. Additionally, cloud-based services can report login and logout information to the management service 116 or identity provider 118. A SSO client application that operates as a hub to access enterprise applications can be installed on a client device 106 and can report usage of enterprise applications to the management service 116 or identity provider 118.

The management service 116 or identity provider 118 can also obtain usage of VDI resources associated with a user from a VDI infrastructure environment. A VDI infrastructure environment can utilize the identity provider 118 for identity management and also report usage data to the management service 116 in some instances.

The tunnel server 120 can provide a virtual private network connection, or a VPN tunnel to an enterprise or private network. The VPN tunnel can be provided to client devices 106 associated with users of the enterprise. The VPN tunnel can be initiated by a tunnel client running on a client device 106 and terminated at the tunnel server 120. The tunnel server 120 can utilize TLS, SSL, or other encryption methodologies to secure a network connection between the client device 106 and the tunnel server 120. The network connection can also be specific to certain apps that are running on the client device 106, such as a tunnel client or other applications on the client device 106 that utilize per-app VPN capabilities of an operating system on the client device 106.

The verification data extraction tool 122 can include a tool that can be provided as an API or another function that is exposed by the management service 116, and invoked or utilized by a console user interface. The console user interface can be a user interface of the management service 116 or a custom user interface accessed using a client device 106. The verification data extraction tool 122 can include a tool that extracts application verification data 137 by analyzing or processing an application 147 and its associated digital signature.

The data stored in the data store 112 can include device data 123, user data 127, application data 129, enterprise resources 139, and potentially other data. Device data 123 can include records to client devices 106 that are enrolled as managed devices with the management service 116. A record within device data 123 can include various security settings selected for enforcement on a client device 106 that is enrolled with the management service 116. Accordingly, a device record can include a device identifier associated with a device, such as the client device 106 and other data associated with managed devices. In some examples, device data 123 can also identify a user associated with or assigned to a particular client device 106. A device record can also store other device specific information, such as a device type, operating system type or version, applications that are required or optional for the device, or an enrollment status of the device. In this scenario, the device data 123 can also indicate whether a managed device is a computing device or a peripheral device, such as a printer, scanner, or another device that can be deployed in an environment and associated with a record in a directory service.

A compliance status 125 of a client device 106 represents whether the device is in compliance with one or more compliance rules. Various compliance rules can be enforced by the management service 116 by the client device 106. Compliance rules can be based on time, geographical location, or device and network properties. For instance, the client device 106 can satisfy a compliance rule when the client device 106 is located within a particular geographic location. The client device 106 can satisfy a compliance rule in other examples when the client device 106 is in communication with a particular local area network, such as a particular local area network that is managed by the enterprise computing environment 103. Furthermore, a compliance rule in another example can be based upon the time and date matching specified values.

A compliance rule can specify that a client device 106 is required to be off or in a low power "sleep" state during a specified time period. Another compliance rule can specify that a client device 106 is required to be on or in a normal operation "awake" state during a specified time period. As another example, a compliance rule can specify that a client device 106 is prohibited from rendering content that has been designated as confidential.

Another example of a compliance rule involves whether a user belongs to a particular user group. For instance, a compliance rule can include a whitelist or a blacklist that specifies whether particular users or groups of users are authorized to perform various functionalities, such as installing or executing a particular application.

Other examples of compliance rules include a rule that specifies whether a client device 106 is compromised or "jailbroken." For example, a client device 106 can have hardware or software protections in place that prevent unauthorized modifications of the client device 106. If these protections are overridden or bypassed, the client device 106 can be considered out of compliance. As another example, a compliance rule can specify that the client device 106 is required to prompt a user for a password or personal identification number (PIN) in order to unlock the device.

A compliance rule can also require that the client device 106 be device encryption enabled, where data stored on the device is stored in an encrypted form. The data can be encrypted by a device certificate. A compliance rule can also specify that the client device 106 is enrolled with the management service 116 as a managed device. Another compliance rule can specify that the user is required to accept the terms of service that are presented by the management component 145 on the client device 106. As another example, a compliance rule can specify that the management component 145 is required to periodically communicate or "check-in" with the management service 116 to report on its status. If a threshold amount of time has elapsed since the previous check-in of the client device 106, the device can be considered to have violated this compliance rule.

Another compliance rule can specify that a client device 106 be running one of a specified variants or versions of a particular operating system. A compliance rule can also specify that an enrolled device be manufactured by a particular manufacturer or have a particular manufacturer identifier. Another compliance rule can specify that an enrolled device be a particular model name or model number. A client device 106 can also be considered out of compliance if the device is in a data roaming mode or has used a threshold amount of a periodic network data usage allowance.

Accordingly, the compliance status 125 indicates whether and to what extent a particular client device 106 is compliant with compliance rules assigned to the client device 106 by the management service 116. The compliance status 125 can be determined by a management component 145 on the client device 106 that analyzes the status of the client device 106 and reports compliance to the management service 116. In other examples, the compliance status 125 can be determined by the management service 116 based upon information about the status of the client device 106 that is reported by the management component 145.

User data 127 contains information about user accounts in a user directory. User accounts can be maintained by a directory service or the identity provider 118. The user accounts can be associated with client devices 106 that are enrolled with the management service 116. The user data 127 can be associated the same user accounts that are verified by the identity provider 118. In some implementations, the identity provider 118 can rely upon a separate set of user account data or a user directory to determine whether to issue an authentication token to an application on behalf of the user. In other implementations, the user data 127 is a user directory associated with the identity provider 118, and the management service 116 accesses the user data 127 through an API provided by the identity provider 118.

User data 127 can include profile information about a user, authentication information about a user, applications that are installed on client devices 106 associated with the user, and other user information. For example, user data 127 can include information about client devices 106 that are associated with a user account of the user, enterprise resources 139 to which a particular user has access, such as email, calendar data, documents, media, applications, network sites, or other resources. The user data 127 can also identify one or more user groups of which a particular user is a member, which can in turn define the access rights of the user to one or more enterprise resources 139 as well as identify which applications should be deployed to a client device 106 associated with the user. To this end, the user data 127 can further identify one or more device identifiers that can uniquely identify client devices 106 that are associated with a user account of the user.

Application data 129 can include application integrity configuration data 135, application verification data 137, and other application information. The application data 129 can be identified, stored, and maintained for a set of applications that are allowed to access enterprise resources 139. An enterprise administrator can access the console user interface to add, remove, and otherwise modify the set of applications that are allowed to access enterprise resources 139, and can specify application-specific subsets of the enterprise resources 139.

Application integrity configuration data 135 can include a set of flags or parameters that indicate which applications 147 must be verified, the type or subset of application verification data 137 to use for verification. Application integrity configuration data 135 can also include an unprotected or basic subset of the enterprise resources 139 to provide access to if the verification is failed, and a protected subset of the enterprise resources 139 to provide access to if the verification is successful.

Application verification data 137 can include expected certificate-based signature data for an application 147 including a serial number; a validity date and time window; application developing or publishing organization information including an organization common name or identifier, an organization location including locality, state, and country; a public key; a thumbprint that can include a shorter version of the public key that is generated by truncation or otherwise processing the public key with an algorithm; a signature issuer including a common name or identifier of the issuer; a name or identifier of the signature type, which can specify a public key algorithm type and a signature algorithm type; the application verification data 137 can also include additional information the describes the application 147, such as its icon, its title or name, its process identifier, and so on. The verification data extraction tool 122 can include a tool that analyzes or processes an application 147 and its associated digital signature to generate the application verification data 137, for example, as a JavaScript Object Notation (JSON) formatted data file, or as another data file or structure. Application verification data 137 can also include a hash that is generated by inputting one or more application files and one or more items of certificate-based signature data and the other non-hashed application verification data 137 into a hashing algorithm.

The network service 107 can be a computing environment that is operated by an enterprise, such as a business or another organization. The network service 107 includes a computing device, such as a server computer, that provides computing capabilities. Alternatively, the network service 107 can employ multiple computing devices that are arranged in one or more server banks or computer banks. In one example, the computing devices can be located in a single installation. In another example, the computing devices for the network service 107 can be distributed among multiple different geographical locations. In one case, the network service 107 includes multiple computing devices that together can form a hosted computing resource or a grid computing resource. Additionally, the network service 107 can operate as an elastic computing resource where the allotted capacity of computing-related resources, such as processing resources, network resources, and storage resources, can vary over time. In other examples, the network service 107 can include or be operated as one or more virtualized computer instances that can be executed to perform the functionality that is described herein.

The network service 107 can be hosted by a third party and provide various services to users of the enterprise. The services can be considered third-party-hosted or provided enterprise resources 139. As a result, providing access to the enterprise resources 139 can include providing a VPN tunnel using the tunnel server 120 or providing identity services by the identity provider 118 that provide access to a network service 107. Access to the network service 107 can be federated to the identity provider 118 in some examples. Users can utilize an client, application 147, or a user interface generated by the network service 107 to access email, calendar, contacts, program services, desktop services, and other resources.

The client device 106 can represent multiple client devices 106 coupled to the network 119 using wired and wireless network connections. The client device 106 includes, for example, a processor-based computer system.

According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user, or a device that is owned by the user. The client device 106, when provisioned, can be enrolled with the management service 116 as a managed device of the enterprise.

The client device 106 can execute a management component 145 that can communicate with the management service 116 to facilitate management of the client device 106. The management component 145 can communicate with the management service 116 to enforce management policies and compliance rules on the client device 106. For example, the management component 145 can enforce data security requirements, install, remove or update security certificates, or write, modify or delete certain data from the client device 106. The management component 145 can also monitor network activity of the client device 106, the location of the client device 106, enforce password or personal identification number (PIN) requirements, or any other security or acceptable-use policies that are defined in the management service 116 and sent to the management component 145 over the network 119.

To carry out local management of a client device 106, the management component 145 can be installed and executed with elevated or administrative privileges on the client device 106. In some scenarios, the operating system can allow a particular application or package to be identified as a device owner or a device administrator.

One or more applications 147 can be installed on the client device 106. As a managed device that is enrolled with the management service 116, some applications 147 can be installed by the management service 116. In one scenario, the management service 116 can send a request to the management component 145 to retrieve and install a particular application 147 on the client device 106. In this sense, installation of the application is initiated by the management service 116. The management service 116 can also provide configuration data for a particular application 147 that it installed on the client device 106.

Another example of an application 147 can be an enterprise hub application or SSO application through which a user can authenticate his or her identity and access enterprise applications. Such an application can collect application usage data for applications associated with the enterprise and report the usage data to the management service 116 or the identity provider 118. In some examples, the management component 145 can be considered an application 147.

A tunnel client 151 can be installed on a client device 106 to provide a VPN connection that is terminated at the tunnel server 120. The VPN connection can be an encrypted network connection that provides access to internal enterprise networks for applications 147 executed by the client device 106. The VPN connection, in some instances, can also simply encrypt network traffic between the client device 106 and the network 119 for security purposes. In some implementations, rather than utilizing a tunnel client 151 that sets up a VPN connection with the tunnel server 120, per-app VPN capabilities of an operating system of the client device 106 can be utilized. The tunnel client 151 can communicate with the tunnel server 120 to provide certain applications 147 with access to a predetermined gateway or subnetwork that provides a subset of the enterprise resources 139, according to the application integrity configuration data 135. In some examples, the tunnel client 151 can be considered a management component 145.

Figure 2:
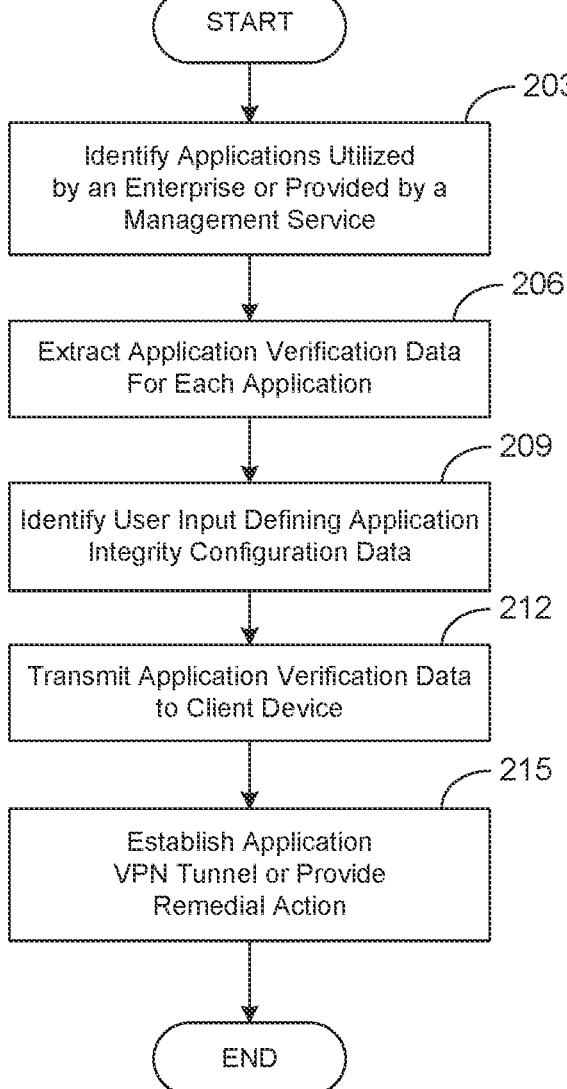
FIG. 2 is a flowchart that illustrates functionality according to an example of the disclosure.

Referring next to FIG. 2, shown is a flowchart that provides one example of how the management service 116 can operate to verify application integrity for application access to enterprise resources 139. The management service 116 can work in concert with other components of the components of the enterprise computing environment 103 and the broader networked environment 100 to perform this functionality. While the steps can be generally discussed as performed by the management service 116, the verification data extraction tool 122 and other components of the networked environment 100 can perform aspects of the steps.

At step 203, the management service 116 can identify applications 147 utilized by an enterprise or provided to the enterprise by the management service 116. An administrative user can add or remove from a list of applications 147 that are allowed to be used to access various enterprise resources 139 such as databases, functions, microapplications, and other resources. Alternatively, the management service 116 can request and receive, from client devices 106 enrolled with the management service 116 in association with the enterprise, a set of installed applications 147.

The management component 145 can receive or retrieve a command to identify installed applications 147, and can transmit this information back to the management service 116. The information can include version information including platform type and supplier version. A supplier can refer to a developer, manufacturer, vendor, or another type of supplier. An administrative user can also upload each application 147, or can provide a URL, URI, or other network address from which the management service 116 can download the applications 147. The management service 116 can alternatively identify and retrieve the network address and the applications 147 themselves based on the application identifier, platform, version, and other information.

An application 147 can include one or multiple different versions corresponding to application supplier versions, as well as multiple different platforms. The enterprise can utilize multiple different platform types and multiple different developer or supplier versions for each platform. Each of the application versions can have its own application verification data 137, since each version of an application 147 can have a different hash and can have a different digital certificate-based signature. In some examples, the application integrity configuration data 135 is shared among all versions of an application 147, and in other cases the application integrity configuration data 135 can differ for each version.

At step 206, the management service 116 can extract application verification data 137 for each application 147. As indicated, the management service 116 can have access to each of the applications 147 executable files and other data. The management service 116 can use the verification data extraction tool 122 that extracts application verification data 137 from the files of an application 147. Application verification data 137 can include expected certificate-based signature data for an application 147 as well as other data. This can include a serial number; a validity date and time window; application developing or publishing organization information including an organization common name or identifier, an organization location including locality, state, and country; a public key; a thumbprint that can include a shorter version of the public key that is generated by truncation or otherwise processing the public key with an algorithm; a signature issuer including a common name or identifier of the issuer; a name or identifier of the signature type, which can specify a public key algorithm type and a signature algorithm type. The verification data extraction tool 122 can include a tool that analyzes or processes an application 147 and its associated digital signature to generate the application verification data 137, for example, as a JavaScript Object Notation (JSON) formatted data file, or as another data file or structure.

At step 209, the management service 116 can identify user input defining application integrity configuration data 135. The management service 116 can include a management console user interface that a user can manipulate to enter, select, and otherwise define application integrity configuration data 135 for each application 147. In some cases, the application integrity configuration data 135 can additionally or alternatively be defined according to a user account, user group, supplier, or other logical groupings. Application integrity configuration data 135 can indicate which applications 147 must be verified, and the type or subset of application verification data 137 to use for verification. Application integrity configuration data 135 can also include an unprotected or basic subset of the enterprise resources 139 to provide access to if the verification is failed, and a protected subset of the enterprise resources 139 to provide access to if the verification is successful.

At step 212, the management service 116 can transmit application verification data 137 to a client device 106. The management service 116 can request and receive, from the tunnel client 151 or management component 145, a list of applications 147 installed on the client device 106. The management service 116 can then transmit application verification data 137 for each of the identified applications 147, rather than all applications 147 used by the enterprise. This can save data, energy, and time. In other examples, information can be provided for all applications 147 or all applications 147 that are to be verified for enterprise resource 139 access. The management service 116 can additionally or alternatively transmit application integrity configuration data 135 and other application data 129 to the client device 106. The management component 145 or tunnel client 151 can perform the verification at launch time of an application 147 or when enterprise resources 139 are requested using the application 147.

In examples where only application integrity configuration data 135 is provided, the management component 145 or tunnel client 151 can transmit a verification request or a tunnel request to the management service 116. The request can include client-side application data from the installed instance of the application 147 on the client device 106. The management component 145 or tunnel client 151 can include instructions that extract and generate data from the application 147, that include the same types of information as extracted by the verification data extraction tool 122 on the server side.

At step 215, the management service 116 can establish an application VPN tunnel or provide a remedial action. Once the management service 116 has compared client application data to the application verification data 137, and the tunnel client 151 has requested or initiated a tunnel, the management service 116 can complete the tunnel using the tunnel server 120 if the data matches and the verification is successful, or implement a remedial action if the verification fails. A result of the comparison can be referred to as an application verification status. The application verification status can indicate success or failure, and can be used to determine whether to establish an application VPN tunnel to a protected subset of enterprise resources 139, or perform a remedial action.

In cases where the client device 106 can perform the check, the management service 116 can receive a result of the verification, and can complete the tunnel using the tunnel server 120 or provide a remedial action. If the verification succeeds, then a VPN tunnel to protected enterprise resources 139 can be established. If the verification fails, the remedial action can include one or more of rejecting the tunnel request to protected enterprise resources 139, notifying the user, notifying an administrator, and providing a basic, limited, or unprotected subset of the enterprise resources 139 are nevertheless provided by connecting the VPN tunnel to a subnetwork, gateway, or another network.

Figure 3:
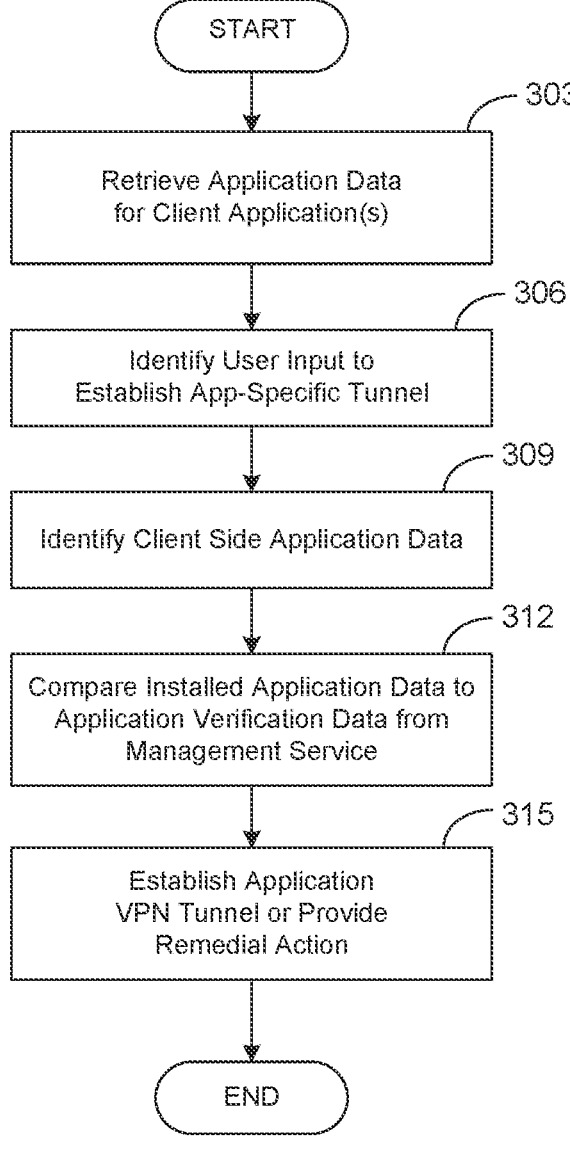
FIG. 3 is another flowchart that illustrates functionality according to an example of the disclosure.

Referring next to FIG. 3, shown is a flowchart that provides one example of how the components executed by the client device 106 can operate to verify application integrity for application access to enterprise resources 139. The management component 145 and the tunnel client 151 can work in concert with components of the networked environment 100 and the various components of the enterprise computing environment 103 to perform this functionality. While the steps can be generally discussed as performed by the client device 106, this can refer to the management component 145 and the tunnel client 151 other components executed by the client device 106. Further, other components of the networked environment 100 can perform aspects of the steps.

At step 303, the client device 106 can receive or retrieve application data 129 for applications 147. This can include application data 129 limited to applications 147 installed on the client device 106; application data 129 for all applications 147 that are used by the enterprise according to a list maintained by the management service 116; or application data 129 for applications 147 configured to be verified for enterprise resource 139 access.

The client device 106 can transmit a list of installed applications 147 to the management service 116. The management service 116 can transmit application data 129 for each of the identified applications 147. This can save data, energy, and time. In other examples, application data 129 can be provided for all applications 147 or all applications 147 that are to be verified for enterprise resource 139 access.

The application data 129 can include application integrity configuration data 135. This can enable the client device 106 to identify which applications 147 are to be integrity verified prior to establishing a VPN tunnel for enterprise resource 139 access. If the application data 129 is limited to application integrity configuration data 135, then the client device 106 can transmit a verification request at a predetermined time such as boot time, application launch time, or upon request to access enterprise resources 139 or establishment of a VPN tunnel.

In some examples, the application data 129 can also include application verification data 137. If the application data 129 includes application verification data 137, then the client device 106 can itself extract installed application data and compare it to application verification data 137, and provide the result to the management service 116 or tunnel server 120 when a VPN tunnel is to be established.

At step 306, the client device 106 can identify user input to establish an application specific VPN tunnel. This can include detecting a launch of the tunnel client 151 from a user or an application 147, detecting a launch of an application 147, detecting an action that requests or requires enterprise resources 139, and other user actions on the client device 106.

At step 309, the client device 106 can extract installed application data for an application 147 installed on the client device 106. The management component 145 or tunnel client 151 can include instructions that extract and generate installed application data from the application 147. This installed application data can include the same types of information as extracted by the verification data extraction tool 122 on the server side, so that all or a subset of it can be compared to application verification data 137.

Application verification data 137 can include actual certificate-based signature data for a locally installed instance of the application 147, as well as other data. This can include a serial number; a validity date and time window; application developing or publishing organization information including an organization common name or identifier, an organization location including locality, state, and country; a public key; a thumbprint that can include a shorter version of the public key that is generated by truncation or otherwise processing the public key with an algorithm; a signature issuer including a common name or identifier of the issuer; a name or identifier of the signature type, which can specify a public key algorithm type and a signature algorithm type. The client side extraction tool can analyze or process an installed application 147 and its associated digital signature to generate the installed application data, for example, as a JSON formatted data file, or as another data file or structure.

At step 312, the client device 106 can compare installed application data to application verification data 137. In examples where the application verification data 137 is pre-stored locally to the client device 106, the client device 106 can perform the comparison using the pre-stored data. Alternatively, the client device 106 can request the application verification data 137 for the application 147 at the time the comparison is to be done. In further examples, the client device 106 can work in concert with the management service 116 to perform the comparison by transmitting the installed application data for server-sided comparison. A result of the comparison can be referred to as an application verification status. The application verification status can indicate success or failure, and can be used to determine whether to establish an application VPN tunnel to a protected subset of enterprise resources 139, or perform a remedial action.

At step 315, the client device 106 can establish an application VPN tunnel or provide a remedial action. Once installed the client side application data is compared to the server side application verification data 137, and the tunnel client 151 has requested or initiated a tunnel, the client device 106 can work in concert with the tunnel server 120 to complete an application VPN tunnel or perform a remedial action. The client device 106 can establish an application VPN tunnel to a protected subset of enterprise resources 139 if the data matches and the verification is successful. If the verification fails, the remedial action can include one or more of rejecting the tunnel request to protected enterprise resources 139, notifying the user, notifying an administrator, and providing a basic, limited, or unprotected subset of the enterprise resources 139 are nevertheless provided by connecting the VPN tunnel to a subnetwork, gateway, or another network.

Figure 4:
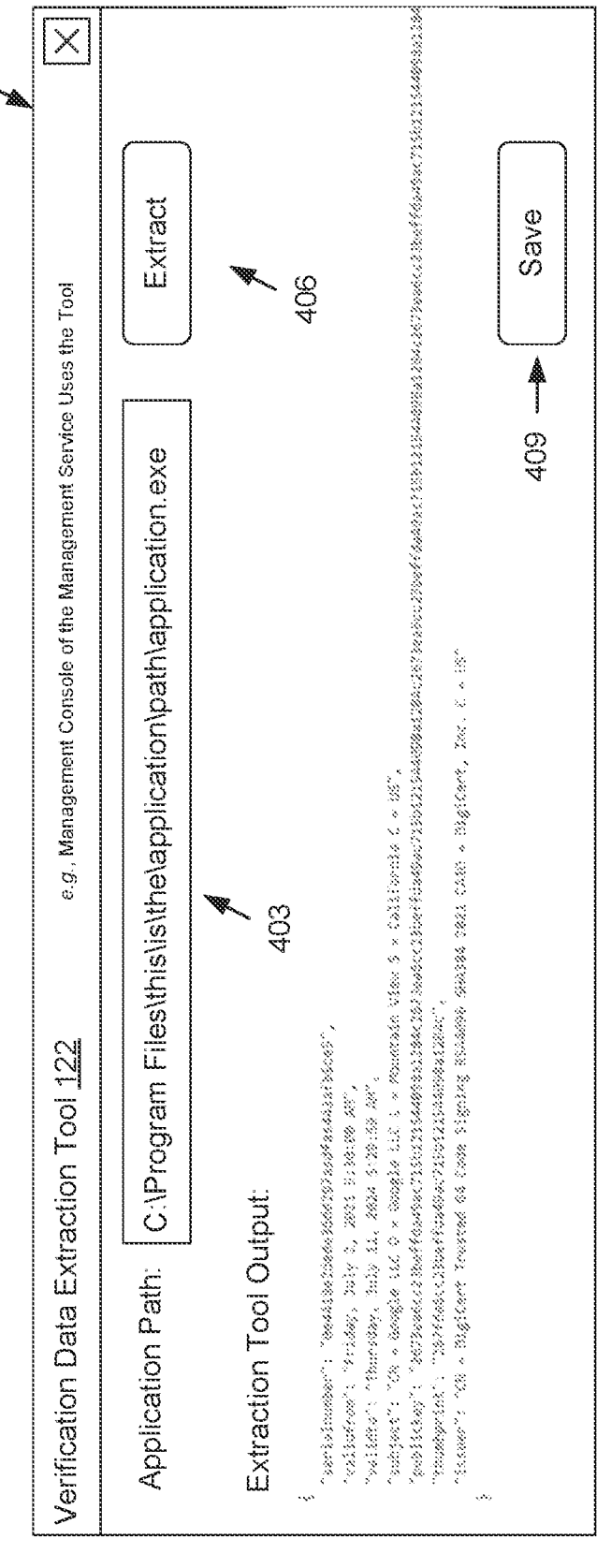
FIG. 4 is an illustration of a user interface that can be utilized in examples of the disclosure.

FIG. 4 shows a user interface 400 that shows one example of the operation of the verification data extraction tool 122. The verification data extraction tool 122 can include the user interface 400, or the management console of the management service 116 can include the user interface 400. In either case, the user interface 400 can include user interface elements 403 through which a user can select or enter an application path for an application 147. In some examples, this can be a local application path on a client device 106 of the administrative user, or another client device 106. In other examples, the application path can be an application path of the enterprise computing environment 103 that is accessible by the verification data extraction tool 122.

A user can manipulate another user interface element 406 to perform an extraction process that generates application verification data 137. As can be seen, the application verification data 137 can include a serial number; a validity date and time window; application developing or publishing organization information including an organization common name or identifier, an organization location including locality, state, and country; a public key; a thumbprint that can include a shorter version of the public key that is generated by truncation or otherwise processing the public key with an algorithm; a signature issuer including a common name or identifier of the issuer; a name or identifier of the signature type, which can specify a public key algorithm type and a signature algorithm type. The output can be generated as a JSON formatted data file, or as another data file or structure. A user can manipulate another user interface element 409 to save the application verification data 137, or else the application verification data 137 can be automatically saved once generated.

While flowcharts can show an example of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although flowcharts can show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 106, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 116, identity provider 118, verification data extraction tool 122, tunnel client 151, management component 145, applications 147, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. While aspects of the disclosure are discussed with respect to a particular figure, the aspects can be applied in combination with the other figures. Many variations and modifications can be made to the above-described examples without departing substantially from the spirit and principles of the disclosure. All of these modifications and variations are intended to be included herein within the scope of this disclosure.

What is claimed is:

1. A system comprising:

one or more processors; and a computer readable storage medium storing a set of instructions executed by the one or more processors to cause the one or more processors to:

receive, by a client device from a management service, application verification data comprising expected certificate-based signature information for an application;

receive a request to establish a per-application virtual private network (VPN) tunnel for a local instance of the application installed on the client device, wherein the per-application VPN tunnel is restricted to the local instance of the application;

in response to the request to establish the per-application VPN tunnel, extract, by the client device, installed application data from the local instance of the application, the installed application data comprising actual certificate-based signature information for the local instance of the application;

generate, by at least one of the client device or the management service, an application verification status using the actual certificate-based signature information and the expected certificate-based signature information; and provide or deny network access to a protected set of enterprise resources for the local instance of the application using the per-application VPN tunnel based at least in part on the application verification status.

2. The system of claim 1, wherein the computer readable storage medium further comprises instructions to:

transmit a request for the application verification data, wherein the request comprises an application identifier of the application.

3. The system of claim 1, wherein the application verification status comprises an indication of a success or a failure, wherein the success is indicated in an instance in which the installed application data matches the application verification data, and the failure is indicated in an instance in which the installed application data fails to match the application verification data.

4. The system of claim 1, wherein the computer readable storage medium further comprises instructions to:

provide access to a default gateway comprising unprotected enterprise resources, in an instance in which the network access to the protected set of enterprise resources is denied.

5. The system of claim 1, wherein the computer readable storage medium further comprises instructions to:

transmit a notification to an administrator or a user of the client device.

6. A non-transitory computer-readable medium comprising machine-readable instructions, wherein the instructions, when executed by at least one processor, cause at least one computing device to at least:

receive a request to establish a per-application virtual private network (VPN) tunnel for a local instance of an application installed on a client device, wherein the per-application VPN tunnel is restricted to the local instance of the application;

in response to the request to establish the per-application VPN tunnel, extract, by the client device, actual certificate-based signature information from the local instance of the application installed on the client device;

generate, by at least one of the client device or a management service, an application verification status using the actual certificate-based signature information and expected certificate-based signature information received from the management service; and provide or deny network access to a protected set of enterprise resources for the local instance of the application using the per-application VPN tunnel based at least in part on the application verification status.

7. The non-transitory computer-readable medium of claim 6, wherein the instructions cause the at least one computing device to at least:

transmit a request for the application verification data, wherein the request comprises an application identifier of the application.

8. The non-transitory computer-readable medium of claim 6, wherein the application verification status comprises an indication of a success or a failure, wherein the success is indicated in an instance in which the actual certificate-based signature information matches the expected certificate-based signature information, and the failure is indicated in an instance in which the actual certificate-based signature information fails to match the expected certificate-based signature information.

9. The non-transitory computer-readable medium of claim 6, wherein the instructions cause the at least one computing device to at least:

provide access to a default gateway comprising unprotected enterprise resources, in an instance in which the network access to the protected set of enterprise resources is denied.

10. The non-transitory computer-readable medium of claim 6, wherein the instructions cause the at least one computing device to at least:

transmit a notification to an administrator or a user of the client device.

11. A method performed using instructions executed by at least one computing device, the method comprising:

receiving a request to establish a per-application virtual private network (VPN) tunnel for a local instance of an application installed on a client device, wherein the per-application VPN tunnel is restricted to the local instance of the application;

in response to the request to establish the per-application VPN tunnel, extracting, by the client device, actual certificate-based signature information from the local instance of the application installed on the client device;

generating, by at least one of the client device or a management service, an application verification status using the actual certificate-based signature information and expected certificate-based signature information received from the management service; and providing or denying network access to a protected set of enterprise resources for the local instance of the application using the per-application VPN tunnel based at least in part on the application verification status.

12. The method of claim 11, further comprising:

transmitting a request for the application verification data, wherein the request comprises an application identifier of the application.

13. The method of claim 11, wherein the application verification status comprises an indication of a success or a failure, wherein the success is indicated in an instance in which the actual certificate-based signature information matches the expected certificate-based signature information, and the failure is indicated in an instance in which the actual certificate-based signature information fails to match the expected certificate-based signature information.

14. The method of claim 11, further comprising:

performing a remedial action comprising providing access to a default gateway comprising unprotected enterprise resources, in an instance in which the network access to the protected set of enterprise resources is denied.

* * * * *